United States Patent [19]
Bremner

[11] Patent Number: 5,863,173
[45] Date of Patent: Jan. 26, 1999

[54] VEHICULAR DECK ATTACHMENT AND ASSEMBLY

[75] Inventor: Ray A. Bremner, Maple Ridge, Canada

[73] Assignee: Arman Industries Ltd., Maple Ridge, Canada

[21] Appl. No.: 14,039

[22] Filed: Jan. 27, 1998

[51] Int. Cl.⁶ ..................................................... B60P 1/02
[52] U.S. Cl. ...................... 414/462; 280/414.1; 414/556; 414/559
[58] Field of Search ........................... 280/414.1; 410/26; 414/462, 471, 556, 559

[56] References Cited

U.S. PATENT DOCUMENTS

| | | | |
|---|---|---|---|
| 3,872,989 | 3/1975 | Smithson et al. | 414/462 |
| 4,239,438 | 12/1980 | Everson | 414/462 |
| 4,469,346 | 9/1984 | Low | 280/414.1 |
| 4,589,814 | 5/1986 | Cates | 280/414.1 X |
| 5,152,656 | 10/1992 | Potter | 414/462 |
| 5,468,115 | 11/1995 | Alvis | 414/462 X |
| 5,704,756 | 1/1998 | Marteneg et al. | 414/462 X |

Primary Examiner—Janice L. Krizek
Attorney, Agent, or Firm—Robert H. Barrigar; Barrigar & Moss

[57] ABSTRACT

A vehicle for supporting cargo in two tiers includes a lower frame for supporting cargo at a lower level and an upper frame for supporting cargo in an elevated position above the lower frame. The vehicle includes a forward support tower and a rear support tower. The forward support tower is pivotally connected to and supports the forward portion of the upper frame. The rear support tower is pivotally connected to and supports the rear portion of the upper frame. The support provided to the rear portion of the upper frame by the rear support tower is longitudinally displaceable, relative to the rear support tower. The lower portion of the rear support tower is pivotally connected to and supported by the rear portion of the lower frame. The rear portion of the upper frame supported by the rear support tower can be longitudinally displaced relative to the rear support tower, and the upper frame can be pivoted, at the forward portion thereof, about the pivotal support on the forward support tower, to move the upper frame between an upright position and a loading position. In the upright position, the upper frame is supported in an elevated substantially horizontal alignment by the forward support tower and the rearward support tower at a clearance height sufficiently above the lower frame to facilitate loading of the lower frame. In the loading position, the upper frame is inclined with the rearward portion thereof extending downwardly to facilitate loading and unloading of the upper frame while the forward portion thereof remains at substantially the clearance height.

18 Claims, 10 Drawing Sheets

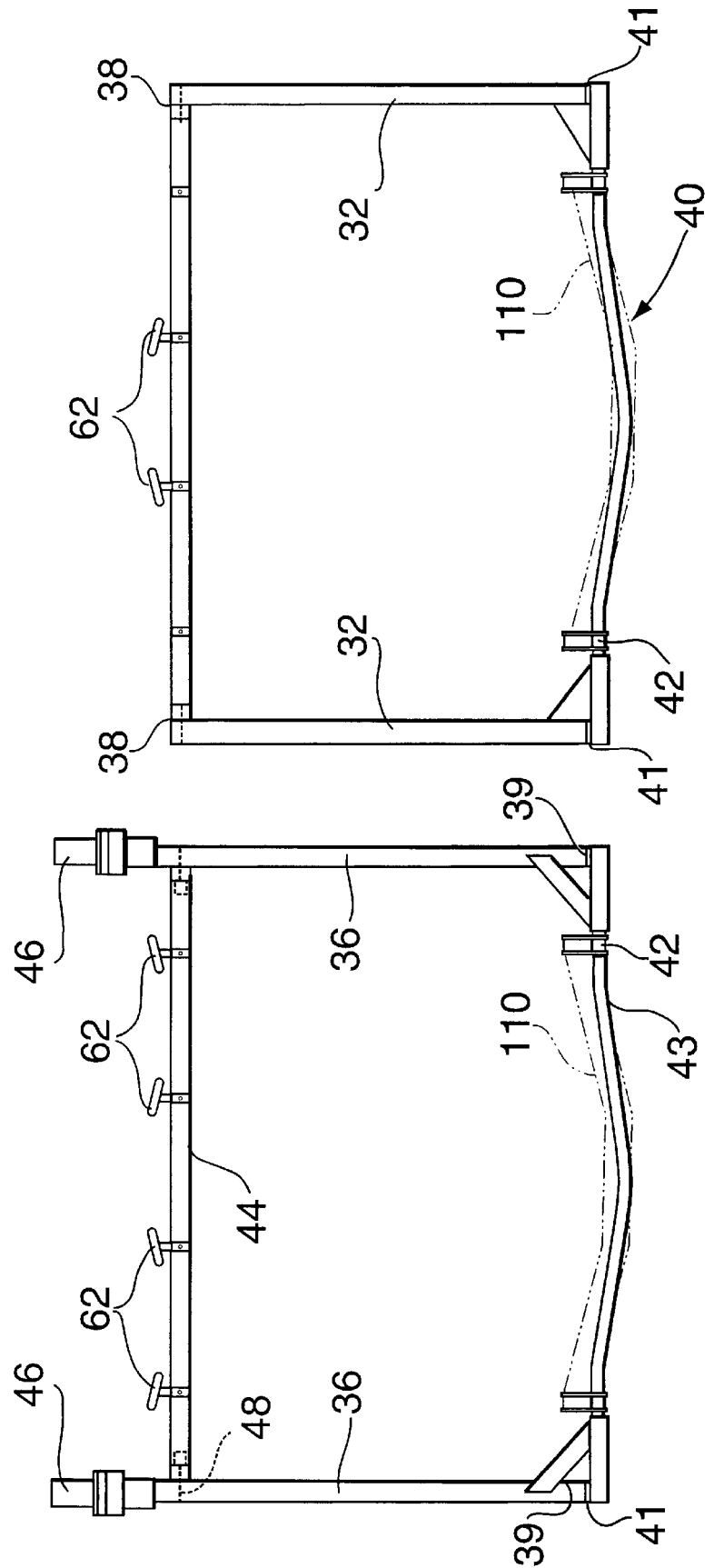

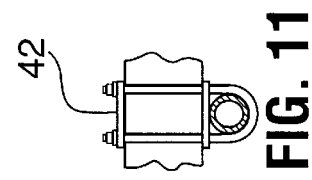
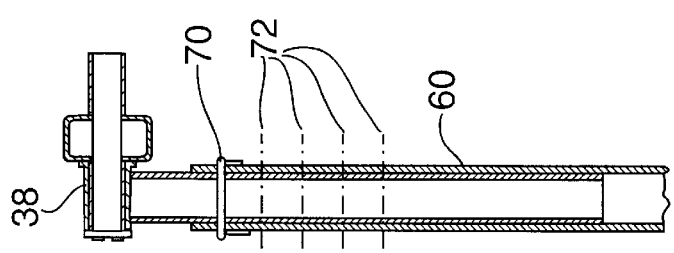
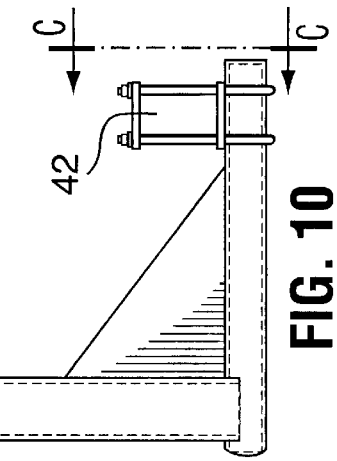
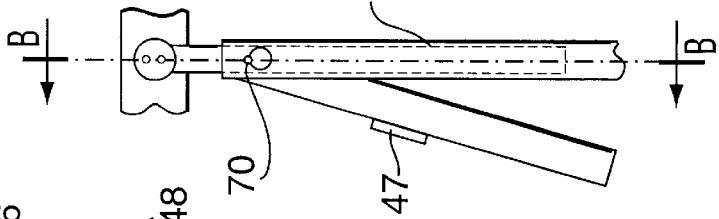
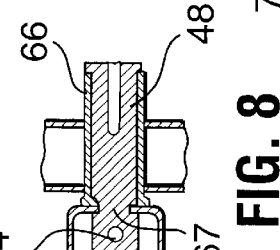
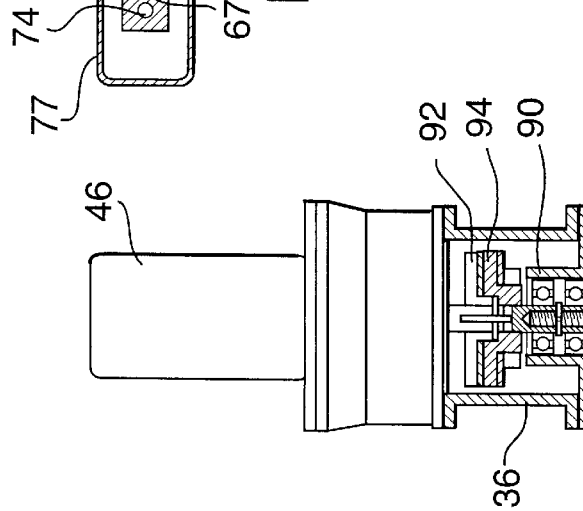
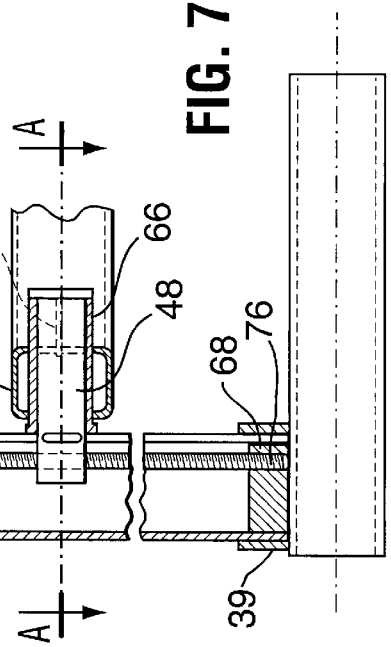
FIG. 11
FIG. 10
FIG. 9
FIG. 8
FIG. 7

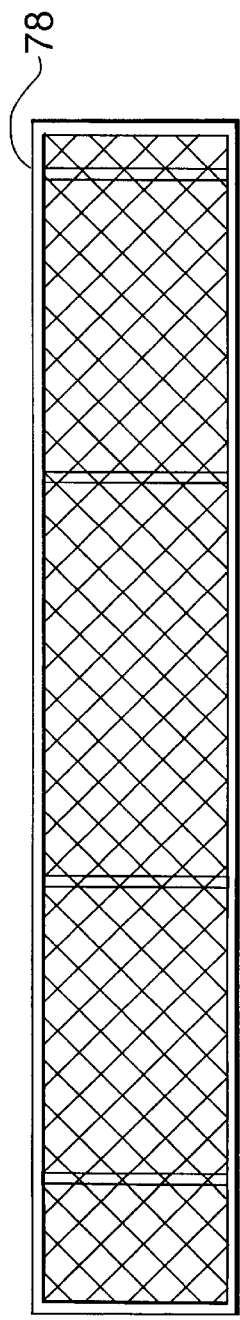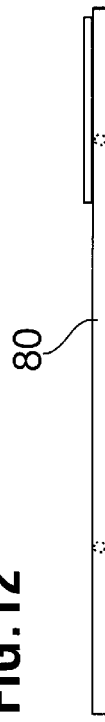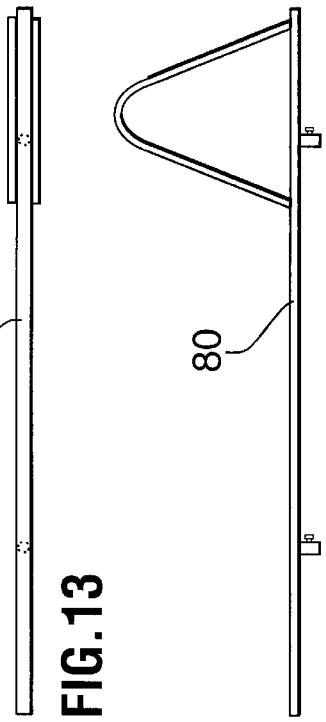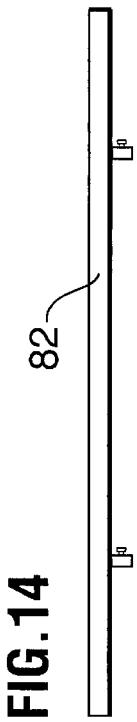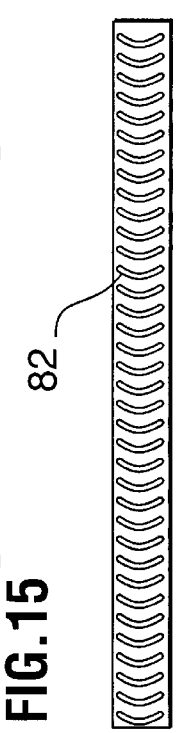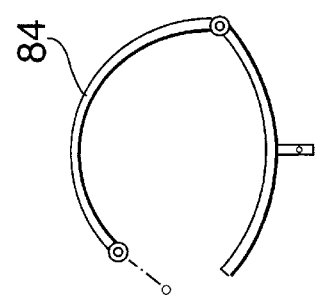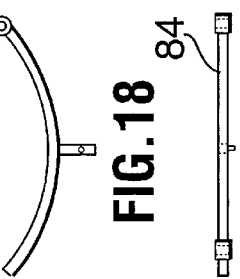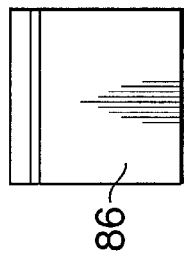

VEHICULAR DECK ATTACHMENT AND ASSEMBLY

FIELD OF THE INVENTION

This invention relates generally to a vehicular attachment for carrying cargo, and more particularly relates to a vehicular deck attachment and assembly for mounting on a trailer or truck bed.

BACKGROUND OF THE INVENTION

Vacationers who use only a single car and trailer or truck to transport themselves and their equipment to their destination are frequently forced to limit the amount of equipment they take with them due to the space limitations of the trailer or truck bed. This problem is particularly severe where the equipment to be transported includes large, bulky items such as boats, personal watercraft, all-terrain vehicles or other recreational vehicles. One way to increase the storage space available is to add a vehicular deck onto an existing trailer or truck bed so that both the space above the trailer deck or truck bed and below the vehicular deck, and the space above the vehicular deck, can be used to transport bulky items of equipment.

There have been several attempts to devise vehicular decks to address the aforementioned problems. For example, U.S. Pat. No. 4,589,814 (Cates) discloses a boat and car trailer in which a boat is supported on a secondary loading platform while a car is supported on a primary platform. The secondary loading platform is supported above the primary platform by legs. Each leg is connected to a bottom pivot by a right-angle bottom projection that extends rearward at the bottom end of such leg, and to a top pivot by a right-angle top projection that extends forward at the top end of such leg. These right-angle projections are configured such that when the legs are extending perpendicularly between the secondary loading platform and the primary platform, each of the projections is flush against one of the platforms, thereby preventing the legs from pivoting such that the secondary loading platform moves forward relative to the primary platform. However, the projections do not prevent pivoting in the reverse direction; the secondary loading platform can pivot rearwardly relative to the primary platform. Instead, the support legs are pivotally mounted to the boat trailer frame at their bottom ends and the upper support members at their top ends such that the upper support members can be lowered rearwardly by pivoting the support legs rearwardly about their pivotal mounts on the trailer. The secondary loading platform is lowered to permit unloading or loading.

The rearward pivoting of the legs to lower the secondary loading platform of U.S. Pat. No. 4,589,814 is typical of many of the prior art vehicular decks. In particular, U.S. Pat. Nos. 5,468,115 (Alvis) and 4,469,346 (Low) disclose these rearwardly pivoting support legs. Some disadvantages arise from this reliance on rearward pivoting to permit loading and unloading of the vehicular deck.

Generally, the vehicular deck should be built to be strong enough to support the weight of the cargo placed on the vehicular deck as well as the moments generated by the acceleration of the transport vehicle. Generally, the support legs will be in a better position to withstand these moments if they are rigidly mounted to the trailer or truck bed at their bottom ends, and to the auxiliary support platform at their upper ends. With the aforementioned vehicular decks, it will be necessary to provide a detachable brace, or some other component having an equivalent function, to impede unwanted rearward pivoting of the legs. This detachable brace must be removable to permit rearward pivoting of the legs when the auxiliary platform is to be lowered. The need for this additional component may increase both the manufacturing expense and weight of the vehicular deck, and may also add to the time required to load and unload the vehicular deck.

SUMMARY OF THE INVENTION

An object of one aspect of the present invention is to provide an improved vehicular deck. In accordance with one aspect of the present invention there is provided a vehicular deck assembly for mounting on a mobile support structure. The vehicular deck assembly comprises a first support tower, a second support tower, securing means, and a deck component. The first support tower includes (1) a first proximal end for rigidly securing the first support tower to the mobile support frame such that the first support tower extends substantially upwards from the mobile support frame; and, (2) a first distal end. The first distal end has a first mounting means.

The second support tower includes (1) a second proximal end for securing the second support tower to the mobile support frame such that the second support tower extends substantially upwards from the mobile support frame; and, (2) a second mounting means. After assembly, the second mounting means provides longitudinally displaceable support relative to the second support tower.

The securing means (1) detachably and rigidly secures the first support tower to the mobile support structure, and (2) detachably secures the second support tower to the mobile support structure.

The deck component has a first end and a second end. The first end is pivotably supported by the first mounting means when assembled, while the second end is continuously supported by the second mounting means when assembled such that the second end is vertically adjustable.

After assembly, the second end can be raised and lowered by the second mounting means, and the first end can be pivoted about the first mounting means to move the deck component between an upright position and a loading position. In the upright position, the deck component is supported in an elevated substantially horizontal alignment by the first support tower and the second support tower at a clearance height sufficiently above the mobile support structure to facilitate loading of the mobile support structure. In the loading position, the deck component is inclined with the second end extending downwardly to facilitate loading and unloading of the deck component while the first end remains at substantially the clearance height.

In accordance with another aspect of the present invention there is provided a vehicle for supporting cargo in two tiers including a lower frame for supporting cargo at a lower level and an upper frame for supporting cargo in an elevated position above the lower frame. The vehicle comprises a forward support tower and a rear support tower. The forward support tower is located in the forward portion of the vehicle and is fixed to the lower frame. The forward support tower supports the forward portion of the upper frame via an upper forward pivotal support—a forward portion of the upper frame is pivotally connected to the pivotal support of the forward support tower.

The rear support tower supports the rear portion of the upper frame and has an adjustable upper rear pivotal support that supports the upper frame. The rear support tower is in turn supported by the rear portion of the lower frame, to which the rear support tower is pivotally connected at its lower portion. The adjustable upper rear pivotal support provides longitudinally displaceable support, relative to the rear support tower, to the rear portion of the upper frame, which is pivotally attached to and supported by the upper rear pivotal support. All of the pivotal axes of the aforementioned pivotal connections are generally parallel to one another and are transverse to the direction of motion of the vehicle.

The rear portion of the upper frame supported by the upper rear pivotal support can be longitudinally displaced relative to rear support tower, and the upper frame can be pivoted, at the forward portion thereof, about the pivotal support on the forward support tower, to move the upper frame between an upright position and a loading position. In the upright position, the upper frame is supported in an elevated substantially horizontal alignment by the forward support tower and the rearward support tower at a clearance height sufficiently above the lower frame to facilitate loading of the lower frame. In the loading position, the upper frame is inclined with the rearward portion thereof extending downwardly to facilitate loading and unloading of the upper frame while the forward portion thereof remains at substantially the clearance height.

BRIEF DESCRIPTION OF THE DRAWINGS

A detailed description of the drawings is provided herein below with reference to the following drawings, in which:

FIG. 5, in a rearward end view, illustrates the vehicular deck of FIG. 1;

FIG. 6, in a front end elevation view, illustrates the vehicular deck of FIG. 1;

FIG. 7, in a detail view partially in section, illustrates the rear support legs and the rotary drive of the vehicular deck of FIG. 1;

FIG. 8, in a fragmentary sectional view along line A—A of FIG. 7, illustrates the threaded bore engaging the threaded shaft;

FIG. 9, in a fragmentary view, illustrates the forward support legs of the vehicular deck of FIG. 1;

FIG. 10, in a detail view along line B—B of FIG. 9, illustrates the forward support legs of the vehicular deck of FIG. 1;

FIG. 11, in a fragmentary sectional view along line C—C of FIG. 10, illustrates a rigid coupling securing the forward support legs of the vehicular deck of FIG. 1 to a trailer;

FIG. 12, in a plan view, illustrates an extended metal deck accessory for attaching to the vehicular deck of FIG. 1;

FIG. 13, in a plan view, illustrates a bike support accessory for attaching to the vehicular deck of FIG. 1;

FIG. 14, in a side elevation view, illustrates the bike support accessory of FIG. 13;

FIG. 15, in a side elevation view, illustrates an all-terrain vehicle (ATV) support accessory for attaching to the vehicular deck of FIG. 1;

FIG. 16, in a plan view, illustrates the ATV support accessory of FIG. 15;

FIG. 17 in a plan view, illustrates a canoe-securing accessory for attaching to the vehicular deck of FIG. 1;

FIG. 18, in a side elevation view, illustrates the canoe-securing accessory of FIG. 17;

FIG. 19, in a plan view, illustrates a storage box for attaching to the vehicular deck of FIG. 1;

FIG. 20, in a side elevation view, illustrates the storage box of FIG. 19;

FIG. 21, in an end elevation view, illustrates the storage box of FIG. 19;

DETAILED DESCRIPTION OF THE PREFERRED EMBODIMENTS OF THE INVENTION WITH REFERENCE TO THE DRAWINGS

Figure 1:
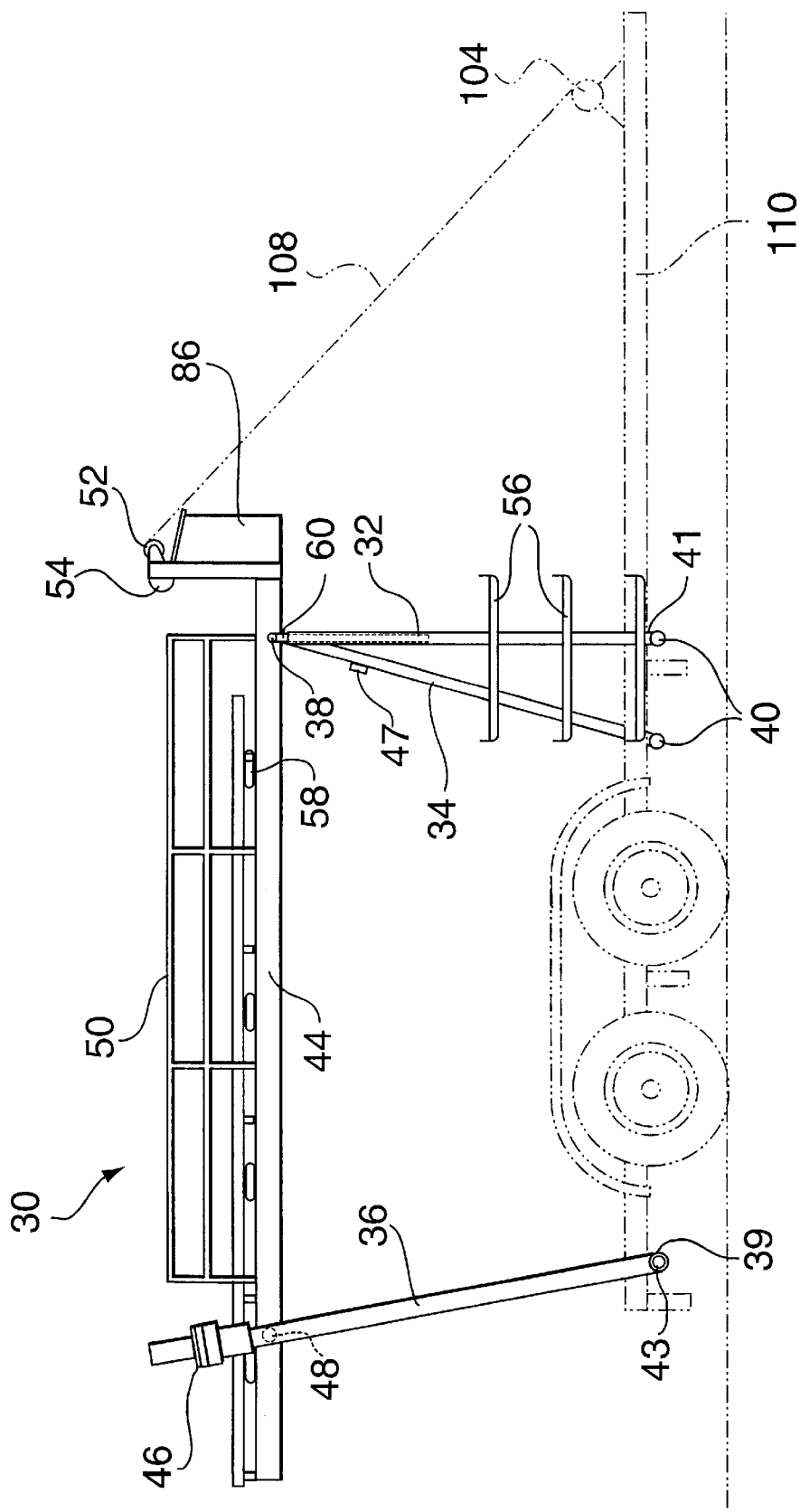
FIG. 1, in a side elevation view, illustrates a vehicular deck in the upright position in accordance with an embodiment of the invention.

Referring to FIG. 1, there is illustrated a vehicular deck attachment 30 in accordance with a preferred embodiment of the invention. The vehicular deck attachment 30 is shown mounted on a trailer 110 and comprises forward support legs 32, 34 and rear support legs 36. Rear support legs 36 are pivotably secured to a rear cross member 43, which itself is secured to the trailer 110 by clamps 42, while forward support legs 32 and 34 are rigidly secured to the trailer 110 by forward cross member 40 and clamps 41.

The vehicular deck attachment 30 also includes a deck component 44, shown in an upright position in FIG. 1; the deck component 44 is mounted toward the upper ends of forward support legs 32, 34 and rear support legs 36 at a clearance height above the trailer 110 when in the upright position. The forward end of deck component 44 includes forward pivot housings (not shown) that receive forward pivot pins 38 on the forward support legs 32, 34, such that the rearward end of the deck component 44 can pivot downwardly from the upright position illustrated in FIG. 1. The length of each of the forward support legs 32, 34 can be adjusted at an adjustable link 60, thereby changing the clearance height at which the deck component 44 is supported above the trailer 110. Forward support legs 32, 34 also include ladder treads 56 to facilitate access to the deck component 44 when it is in the upright position.

At its rearward end, the deck component 44 is movably supported by two support pins 48, as shown in FIGS. 7 and 8. FIGS. 7 and 8 illustrate the interaction of the two support pins 48 with the rear support legs 36. Referring to FIG. 7, a rotary drive 46 is mounted above each of the rear support legs 36 on drive mounts 92. Each of the rear support legs 36 includes a casing 77 surrounding a threaded shaft 76; the threaded shaft is mounted for rotation in shaft bushing 68. The threaded shafts 76 can be driven by the rotary drives 46 via clutches 94 and thrust bearings 90. Referring to FIG. 8, each casing 77 includes a longitudinal slot 67 through which the support pin 48 projects. That portion of each support pin 48 that is within the casing 77 includes a threaded bore or nut 74 that encircles and engages the threaded shaft 76. As rotation of each support pin 48 is blocked by the casings 77, rotation of the threaded shaft 76 moves the support pin 48 longitudinally relative to the threaded shaft 76, the direction of the longitudinal movement being determined by the direction of the rotation of the threaded shaft 76. Thus, the support pins 48 can be moved up and down along the rear support legs 36 thereby raising and lowering the deck component 44. The deck component 44 is free to pivot relative to the support pin 48 when being raised or lowered.

Figure 2:
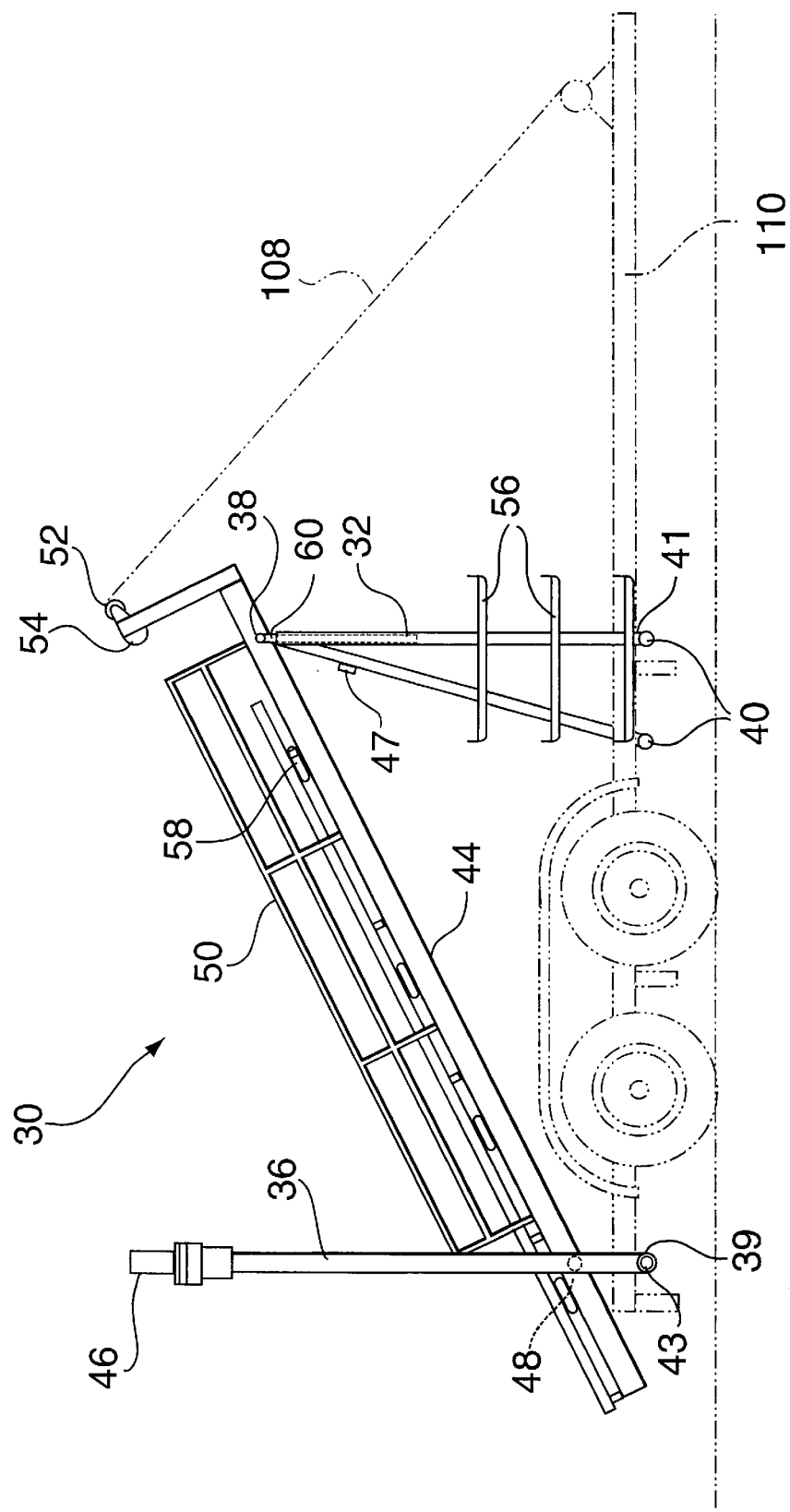
FIG. 2, in a side elevation view, illustrates the vehicular deck of FIG. 1 in the loading position.
Figure 3:
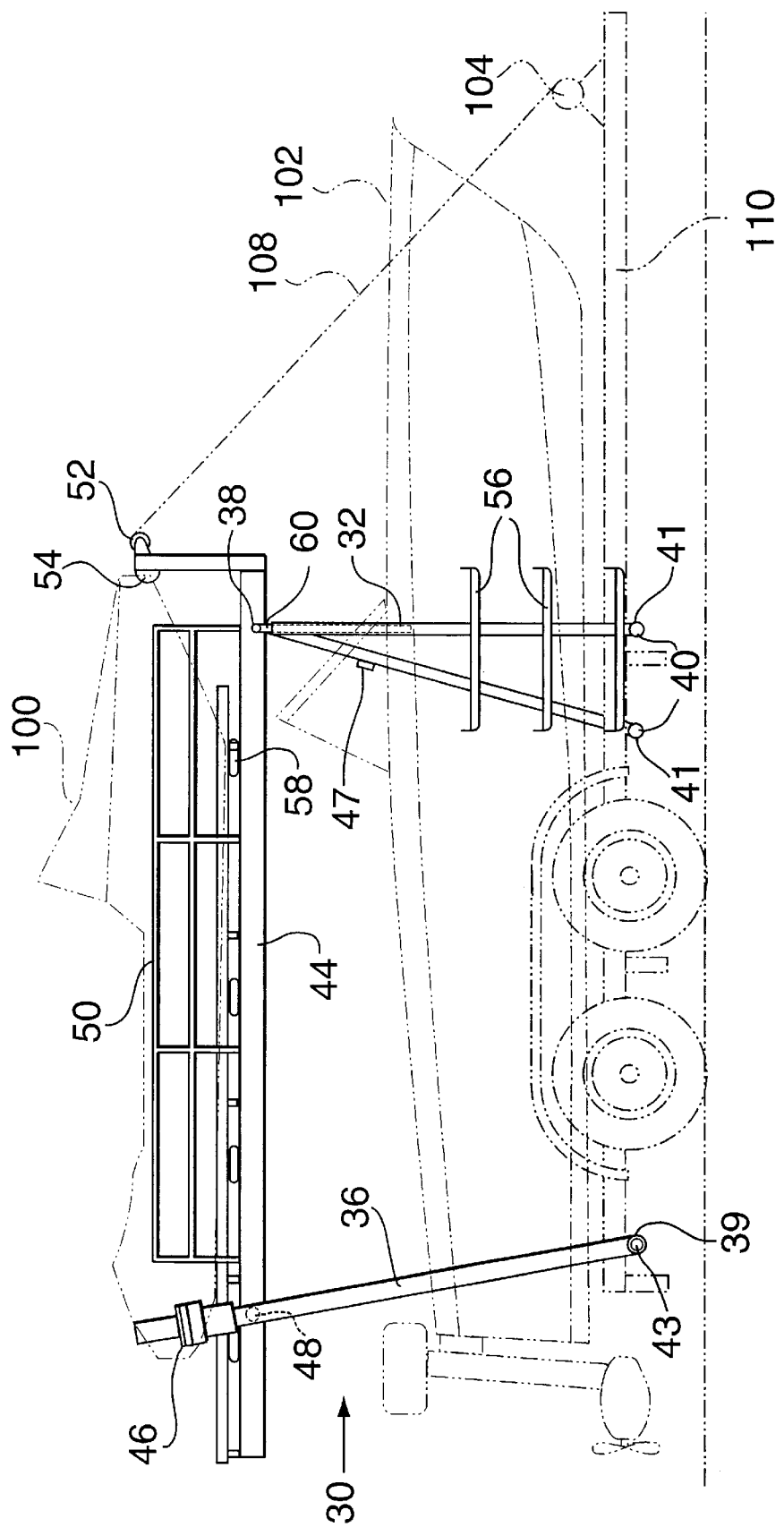
FIG. 3, in a side elevation view, illustrates the vehicular deck of FIG. 1 when mounted on a trailer in the upright position.
Figure 4:
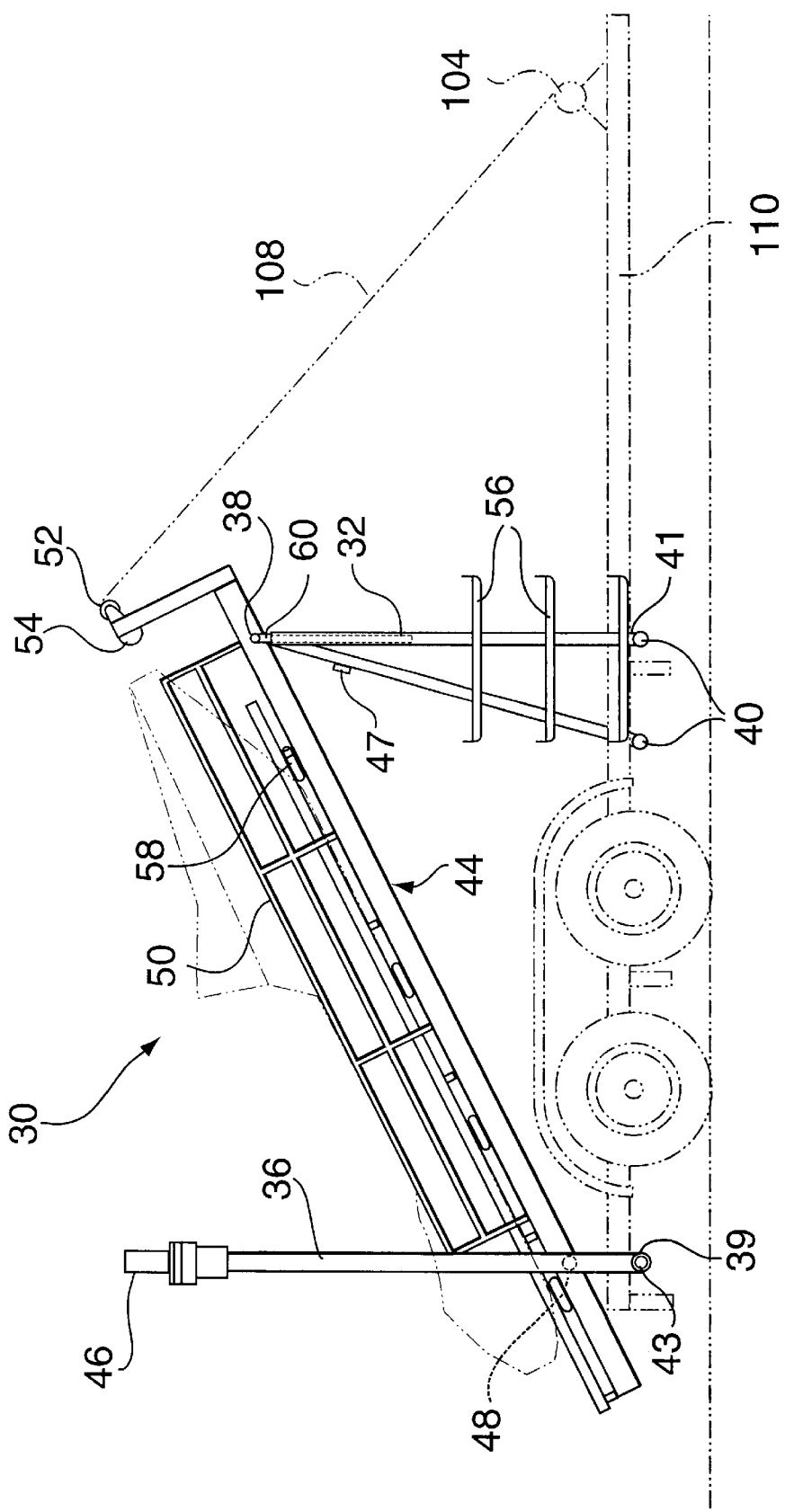
FIG. 4, in a side elevation view, illustrates the vehicular deck of FIG. 1 when mounted on a trailer in the loading position.

The deck component 44 includes guard rails 50 along its sides, a bumper 54 at its forward end to impede forward movement of cargo, strap clasps 58 at its sides for holding the straps that secure the cargo on the deck component, and a roller 52 that engages a cable 108 from a winch 104 of the trailer 110. The cable 108 and winch 104 are typical components of the trailer 110, and can be used with the vehicular deck attachment 30 to secure the personal watercraft 100 or other vehicle carried on the deck component 44. FIG. 2 illustrates the vehicular deck attachment 30 in the loading position, in which position the rearward end of the deck component 44 has been lowered. FIGS. 3 and 4 illustrate the vehicular deck attachment 30 mounted on the trailer 110 in the upright and loading positions respectively; the trailer 110 is shown carrying a boat 102, while a personal watercraft 100 is carried by the vehicular deck attachment 30.

FIGS. 5 and 6 show the rearward and forward ends of the vehicular deck attachment 30 respectively. As shown in FIG. 5, the bottom ends of rear support legs 36 are pivotably coupled by couplings to rear cross member 43, which is itself secured by clamps 42 to trailer 110. Referring to FIG. 6, the bottom ends of forward support legs 32, 34 are rigidly coupled to forward cross members 40, which are themselves secured by clamps to trailer 110. In FIG. 5, the deck component 44 has two pairs of bunks 62 mounted thereon for supporting two vehicles such as personal watercraft. The bunks are accessories that can be added, moved and removed by the user of the vehicular deck attachment 30. In FIG. 6, the deck component 44 has only one pair of bunks 62 mounted thereon for supporting only a single vehicle.

As shown in FIGS. 7 and 8, the support pins 48 project out of the casings 77 through the longitudinal slots 67 and into pivot housings 66 of the deck component 44 in order to provide support to the deck component 44 while allowing the support pins 48 to pivot relative to the deck component 44. Lubricant is provided to the pivot housings 66 via lubrication channels 88 in order to facilitate pivoting of the deck component 44 relative to the support pins 48.

FIGS. 9, 10 and 11 illustrate details of the forward support legs 32, 34. Forward support legs 32, 34 are secured to the trailer 110 by couplings 41 and forward cross member 40, and are adjustable in length at adjustable link 60. The adjustable link 60 includes a number of spaced apertures 72, each of which can be aligned with a corresponding aperture (not shown) in the respective forward support leg 32 and held in place by a link pin 70; the length of adjustable link 60 can be changed by changing the spaced aperture 72 that is aligned with the corresponding aperture in the respective forward support leg 32. By changing the length of the adjustable link 60, the clearance height of the deck component 44 above the trailer can also be changed.

FIGS. 12 through 21 illustrate accessories that can be attached to the deck component 44. FIG. 12 illustrates an extended metal deck 78 that can be attached to the deck component 44 to provide a surface that supports smaller articles that are not individually secured to the deck component 44. The extended metal support deck 78 also provides a surface that is easier for users of the vehicular deck attachment 30 to stand on.

FIGS. 13 and 14 illustrate a bike support 80 that can be used to secure bicycles to the deck component 44. FIGS. 15 and 16 illustrate an all-terrain vehicle support 82 that can be used to secure an all-terrain vehicle to the deck component 44. FIGS. 17 and 18 illustrate a kayak support 84 that can be used to secure kayaks or canoes to the deck component 44. FIGS. 19, 20 and 21 illustrate storage boxes 86 that can be used to securely store small articles on the deck component 44.

Figure 22:
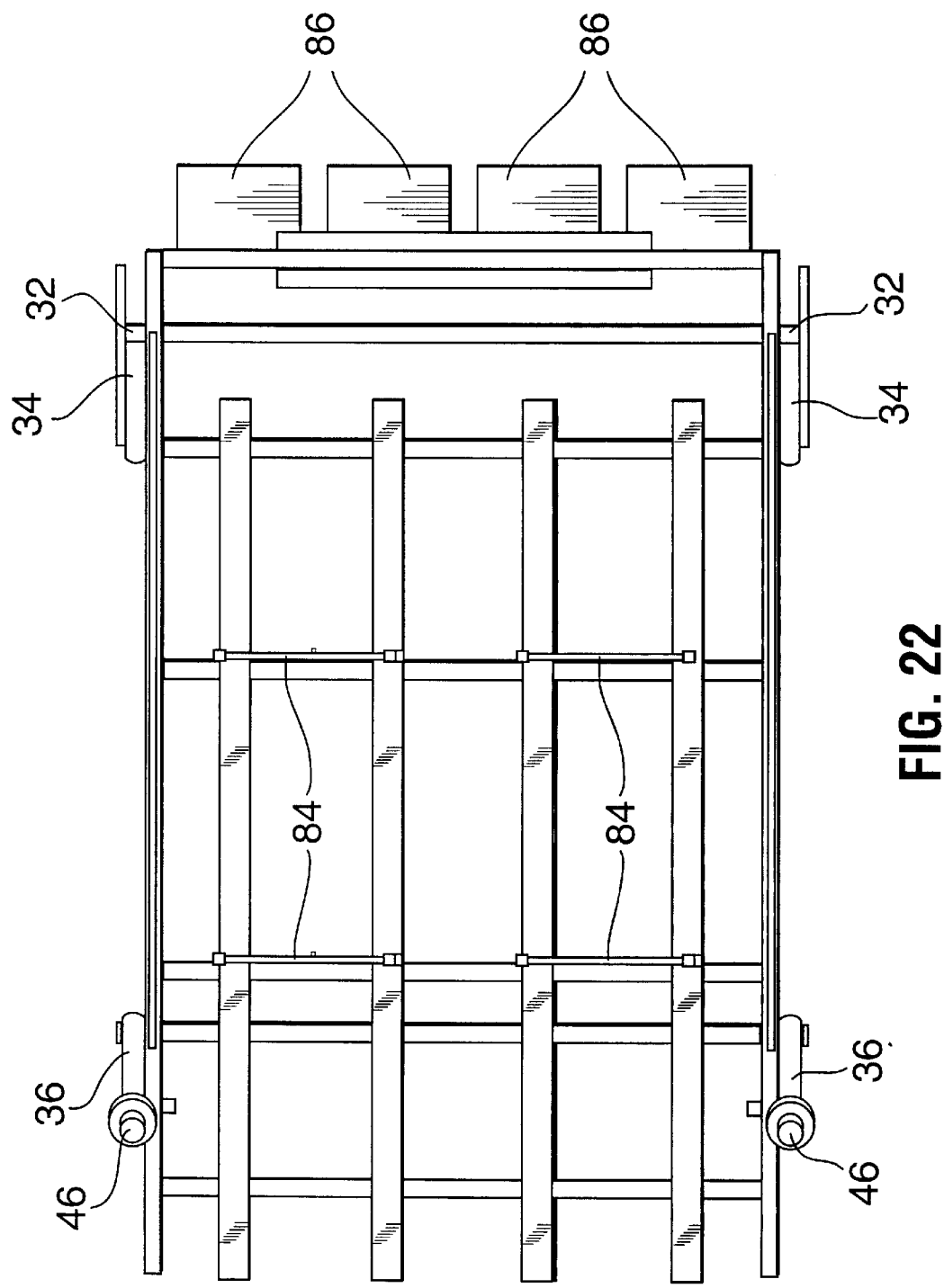
FIG. 22, in a plan view, illustrates the vehicular deck of FIG. 1 with the storage box and the canoe-securing accessory attached; and, FIG. 23, in a plan view, illustrates the vehicular deck of FIG. 1 with the storage box and the extended metal deck accessory attached.
Figure 23:
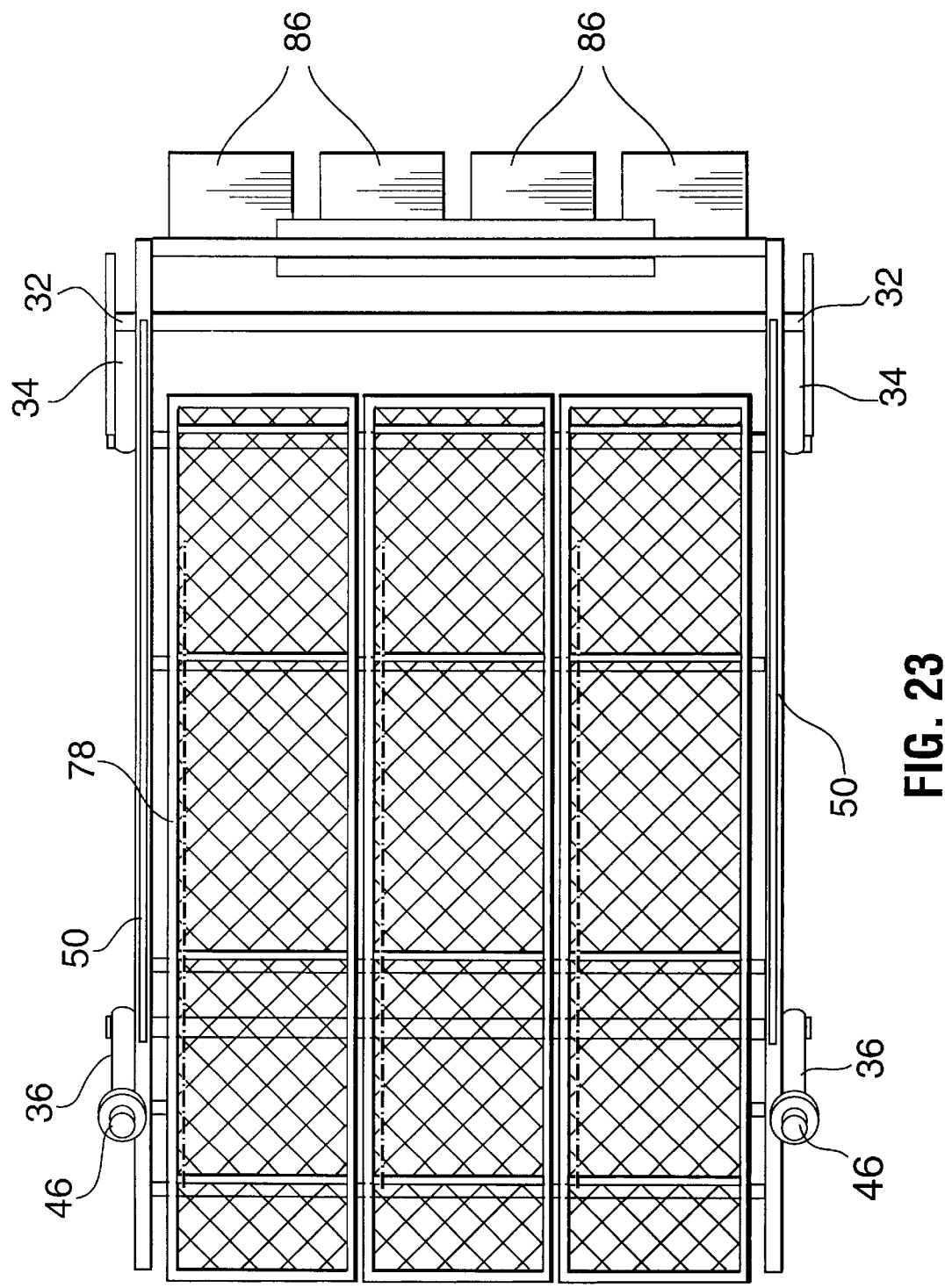

FIGS. 22 and 23 illustrate the deck component 44 with different of the aforementioned accessories attached. In FIG. 22, the deck component 44 is shown with storage boxes 86 and kayak supports 84 attached. In FIG. 23, the deck component 44 is shown with storage boxes 86 and extended metal deck 78 attached.

Figure 24:
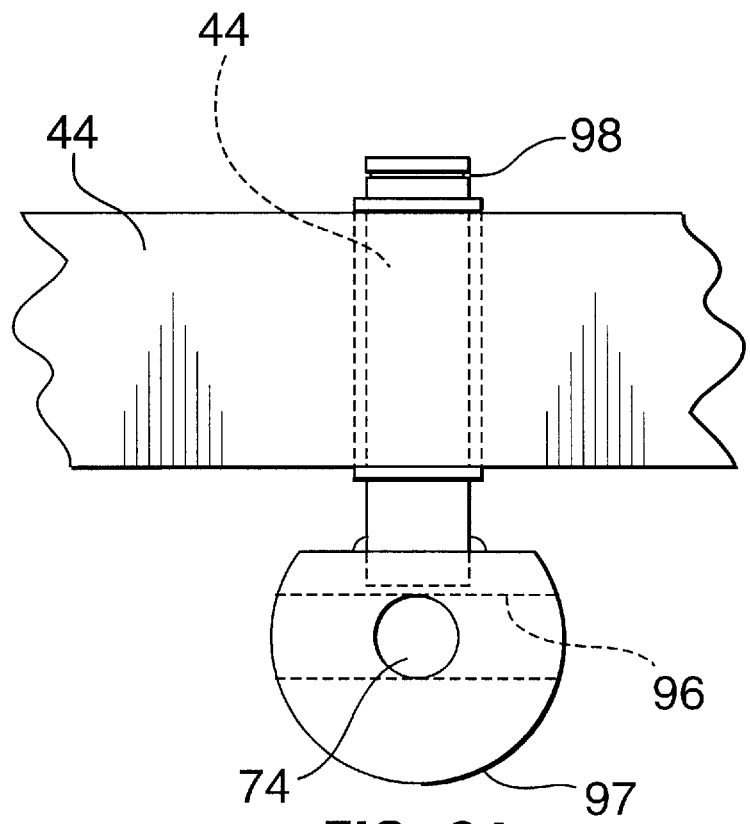
FIG. 24, in a fragmentary view, illustrates a support pin including a cylindrical toggling nut of a preferred embodiment of the invention.
Figure 25:
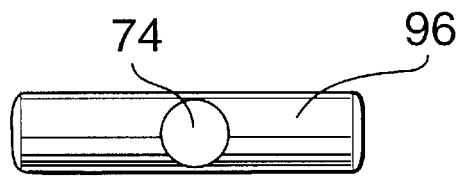
FIG. 25, in a fragmentary view, illustrates the cylindrical toggling nut of FIG. 24 isolated from the remainder of the support pin.

FIGS. 24 and 25 illustrate an aspect of another preferred embodiment of the invention in which each of the support pins 48 comprises a cylindrical toggling nut 96, having a longitudinal axis orthogonal to the axis of rotation of the threaded shaft 76 engaged by such support pin 48, as well as a swivel component 97 that can swivel relative to the cylindrical toggling nut 96. The threaded bore 74 is located in the cylindrical toggling nut 96 while the swivel component projects out through the longitudinal slot 67 and into the pivot housing 66. Together, the cylindrical toggling nut 96 and swivel component 97 enable twisting of the deck component 44 to be compensated for, thereby impeding disalignment of each threaded bore 74 from the threaded shaft 76 encircled by such threaded bore 74. This, in turn, helps to prevent binding of the threaded bore 74 with the threaded shaft 76 encircled by such threaded bore 74. Each of the support pins 48 is held in its respective pivot housing 66 by one of several pin clasps 98. Preferably, a nylon shell (not shown) encompasses the portion of each of the support pins 48 that is within one of the casings 77 to mitigate scratching of the interior of the casings 77 by the support pins 48.

The embodiment of the vehicular deck attachment illustrated in the drawings can be installed as follows. First, rear cross member 43 is secured to the trailer 110 by clamps 42. Second, forward cross members 40 are secured to the trailer 110 by clamps 41 at a certain spaced distance from rear cross member 43. As discussed above, forward support legs 32 and 34 are rigidly secured to forward cross members 40 by couplings 41; alternatively forward support legs 32 and 34 may be slid onto forward cross members 40 and secured in place by caps and bolts. Third, the deck component 44 is positioned between the rear support legs 36 and forward support legs 32 and 34, and the forward end of the deck component 44 is raised to fit forward pivot pins 38 on the upper ends of forward support legs 32 into the pivot housings in the deck component 44. Fourth, each of the rear support legs 36 is slid onto opposing ends of rear cross member 43; at the same time, the support pins 48 are guided into their respective pivot housings 66, and are secured in place using their respective pin clasps 98. The rear support legs 36 are pivotally secured to the rear cross member 43 by placing end caps over the ends of the rear cross member 43 and securing the end caps in place with bolts. Fifth, the leads for connecting the rotary drive to the battery, which were initially stored in the storage box 86, are installed. The battery is then turned on. Raising and lowering of the rearward end of the deck component is controlled by switch 47 on forward support legs 34.

Other variations, consistent with the invention will readily occur to those skilled in the art. For example, if support pin 48 is mounted in a slot in deck component 44 such that support pin 48 is free to slide along deck component 44 so that the distance between support pin 48 and forward pivot pins 38 is free to vary as the rearward end of the deck component 44 is raised or lowered, then the rear coupling need not be pivotable, but can instead be rigid. Instead of using the winch 104 of the trailer 110, a winch can be mounted on the forward end of the deck component 44. Used with a cable, the winch can pull cargo vehicles onto the deck component 44 when the deck component 44 is in the loading position. Further more, instead of being embodied as a vehicular attachment, the invention may itself be a vehicle having the aforementioned components as integral parts of the vehicle. Accordingly, the invention is as defined in the claims.

What is claimed is:

1. A vehicular deck assembly for mounting on a mobile support structure, the vehicular deck assembly comprising
   (a) a first support tower, the first support tower having
      (i) a first proximal end for rigidly securing the first support tower to the mobile support structure and for extending substantially upwardly therefrom; and,
      (ii) a first distal end, the first distal end having, after assembly, a first mounting means;
   (b) a second support tower having
      (i) a second proximal end for securing the second support tower to the mobile support structure and for extending substantially upwardly therefrom; and,
      (ii) after assembly, a second mounting means for providing longitudinally displaceable support relative to the second support tower;
   (c) securing means for detachably and rigidly securing the first support tower to the mobile support structure, and for detachably securing the second support tower to the mobile support structure; and,
   (d) a deck component having
      (i) a first end, the first end being pivotably supported by the first mounting means when assembled, and
      (ii) a second end, the second end being continuously supported by the second mounting means when assembled such that the second end is vertically adjustable;
   wherein, after assembly, the second end can be raised and lowered by the second mounting means, and the first end pivoted about the first mounting means to move the deck component between
      an upright position wherein the deck component is supported in an elevated substantially horizontal alignment by the first support tower and the second support tower at a clearance height sufficiently above the mobile support structure to facilitate loading of the mobile support structure, and
      a loading position wherein the deck component is inclined with the second end extending downwardly to facilitate loading and unloading of the deck component while the first end remains at substantially the clearance height.

2. The vehicular deck assembly as defined in claim 1 further comprising an elevating means for moving the second mounting means; wherein the second mounting means, after assembly, provides movable support to the deck component when being moved by the elevating means, in order to move the deck component between the upright position and the loading position.

3. The vehicular deck assembly as defined in claim 2 wherein, after assembly
   (a) the second support tower comprises a threaded support mounted for rotation, the threaded support providing movable support when rotating and providing fixed support otherwise;
   (b) the elevating means comprises a rotary drive for rotating the threaded support; and,
   (c) the second end of the deck component comprises a thread engaging means for engaging the threaded support without rotating with the threaded support;
   wherein the second end of the deck component is supported by the threaded support via the thread engaging means such that the second end of the deck component moves vertically when the threaded support rotates.

4. The vehicular deck assembly as defined in claim 3 wherein
   (a) the first support tower comprises a plurality of support legs, the plurality of support legs being spaced apart after assembly to facilitate loading of the mobile support structure;
   (b) the threaded support comprises a plurality of rotatable threaded legs, the plurality of rotatable threaded legs being spaced apart after assembly to facilitate loading of the mobile support structure;
   (c) the second mounting means comprises a plurality of mounting threads, each of the plurality of mounting threads projecting from one of the plurality of rotatable threaded legs;
   (d) the thread engaging means comprises a plurality of support pins, each of the plurality of support pins engaging a distinct one of the plurality of the rotatable threaded legs such that the mounting thread of each of the plurality of the rotatable threaded legs provides vertically movable support to the second end of the deck component, the plurality of rotatable threaded legs being rotated concurrently by the rotary drive to vertically adjust the second end of the deck component.

5. The vehicular deck assembly as defined in claim 4 wherein each of the plurality of rotatable threaded legs comprises
   (a) a rotatable threaded shaft, and
   (b) a casing having a longitudinal slot, the rotatable threaded shaft being mounted within the casing;
   each of the plurality of support pins extending through a distinct one of the plurality of longitudinal slots to engage a distinct one of the plurality of mounted shafts.

6. The vehicular deck assembly as defined in claim 5 wherein the plurality of rotatable threaded legs are secured to the mobile support structure at the rearward end thereof, and the plurality of support legs are secured to the mobile support structure at the forward end thereof, such that when the plurality of rotatable threaded legs are lowered by the elevating means, the deck component can be loaded and unloaded at the rearward end of the mobile support structure.

7. The vehicular deck assembly as defined in claim 6 wherein
   (a) each of the plurality of support pins has a threaded bore, the threaded bore encircling a distinct one of the plurality of rotatable threaded legs;
   (b) for each of the plurality of support pins, the deck component comprises an associated pivot opening for receiving the support pin such that the support pin can rotate within the associated pivot opening to support the deck component while the deck component is being raised and lowered between the upright position and the loading position.

8. The vehicular deck assembly as defined in claim 7 wherein for each of the plurality of support pins, such support pin comprises a cylindrical toggling nut and a swivel portion, the threaded bore being in the cylindrical toggling nut and the swivel portion being in the associated pivot housing, such that the cylindrical toggling nut can twist relative to the swivel portion in order to absorb slight twists of the deck component, thereby impeding (a) disalignment of the threaded bore from the distinct one of the plurality of rotatable threaded legs encircled by the threaded bore; and, (b) binding of the threaded bore with the distinct one of the plurality of rotatable threaded legs.

9. The vehicular deck assembly as defined in claim 8 wherein the cylindrical toggling nut absorbs twisting of the deck component by rotating within the swivel portion, the cylindrical toggling nut having a toggling axis of rotation substantially orthogonal to the axes of rotation of the plurality of threaded shafts.

10. The vehicular deck assembly as defined in claim 5 wherein each of the plurality of support pins can slide toward and away from the first mounting means within the associated pivot opening of the plurality of pivot openings when the deck component is being raised and lowered, each of the plurality of rotatable threaded legs is rigidly secured to the mobile support structure.

11. The vehicular deck assembly as defined in claim 5 wherein each of the plurality of rotatable threaded legs is pivotally secured to the mobile support structure such that each of the plurality of rotatable threaded legs can pivot when the deck component is being raised and lowered.

12. A vehicle for supporting cargo in two tiers including a lower frame for supporting cargo at a lower level and an upper frame for supporting cargo in an elevated position above the lower frame, the vehicle comprising a forward support tower located in the forward portion of the vehicle for supporting the forward portion of the upper frame and fixed to the lower frame and having an upper forward pivotal support for the upper frame, the upper frame being pivotally connected at a forward portion thereof to the pivotal support on the forward support tower; and a rear support tower for supporting the rear portion of the upper frame and having an adjustable upper rear pivotal support for the upper frame, the rear support tower being pivotally connected at its lower portion to and supported by the rear portion of the lower frame, the adjustable upper rear pivotal support providing longitudinally displaceable support relative to the rear support tower, the rear portion of the upper frame being pivotally attached to and supported by the upper rear pivotal support of the rear support tower;

the pivotal axes of all of the aforementioned pivotal connections being generally parallel to one another and transverse to the direction of motion of the vehicle;

wherein the rear portion of the upper frame supported by the upper rear pivotal support can be longitudinally displaced relative to the rear support tower, and the upper frame can be pivoted, at the forward portion thereof, about the pivotal support on the forward support tower, to move the upper frame between an upright position wherein the upper frame is supported in an elevated substantially horizontal alignment by the forward support tower and the rear support tower at a clearance height sufficiently above the lower frame to facilitate loading of the lower frame, and a loading position wherein the upper frame is inclined with the rear portion thereof extending downwardly to facilitate loading and unloading of the upper frame while the forward portion thereof remains at substantially the clearance height.

13. A vehicle as defined in claim 12 wherein the forward support tower comprises a pair of transversely spaced forward legs each provided with one of said upper forward pivotal supports for pivotally supporting a respective side of the upper frame.

14. A vehicle as defined in claim 13 wherein the rear support tower comprises a pair of transversely spaced said legs, each provided with one of said adjustable rear pivotal supports and respectively pivotally supporting a respective side of the rear portion of the upper frame and each pivotally connected to a rear portion of a respective side of the lower frame.

15. A vehicle as defined in claim 14 wherein:

the adjustable upper rear pivotal supports of the two rear legs are substantially co-axial;

the pivot connections to the lower frame of each of the rear legs are substantially co-axial; and the pivot connections of the two legs of the forward tower to the upper frame are substantially co-axial.

16. A vehicle as defined in claim 15 wherein the elevation above the lower frame of the adjustable upper rear pivotal support in each of said rear legs is controllable by means of a respective threaded shaft mounted for axial rotation within an associated one of said rear legs and threadingly coupled with a threaded bore of the respective adjustable upper rear pivotal support of the associated said rear leg.

17. A vehicle as defined in claim 16 wherein the rear portion of the upper frame at the lowermost position of the adjustable upper rear pivotal support is in the vicinity of the pivotal connections of the rear legs to the lower frame.

18. A vehicle as defined in claim 17 wherein the threaded shafts are rotatable by a rotary drive to longitudinally displace the rear portion of the upper frame supported by the upper rear pivotal support between the loading position and the upright position.

* * * * *

UNITED STATES PATENT AND TRADEMARK OFFICE
CERTIFICATE OF CORRECTION

PATENT NO. : 5,863,173
DATED : 26 January 1999
INVENTOR(S) : Bremner, Ray A.

Page 1 of 2

It is certified that error appears in the above-identified patent and that said Letters Patent is hereby corrected as shown below:

Abstract line 5, after " . . . and a rear support tower." insert, -- The forward support tower is located in the forward portion of the vehicle and is fixed to the lower frame. --.

The sentence after line 13". by the rear portion of the lower frame." insert, -- All of the pivotal axes of these pivotal connections are generally parallel to one another and are transverse to the direction of motion of the vehicle. --

Column 4, line 37: after "secured" insert --by pivotable couplings 39--.

Column 4, line 38: after "clamps 42" replace ", while forward" with, --(shown in Figures 5 and 6). Forward --.

Column 4, line 39: after "rigidly secured to" replace "the" with, --forward cross members 40 by couplings 41. The cross members 40 are secured to--.

Column 4, line 39: after "trailer 110 by" delete, "forward cross member 40 and".

Column 4, line 40: after "clamps", renumber "41" with -- 42 -- and insert --(shown in Figures 5 and 6)--.

UNITED STATES PATENT AND TRADEMARK OFFICE
CERTIFICATE OF CORRECTION

PATENT NO.  : 5,863,173
DATED       : 26 January 1999
INVENTOR(S) : Bremner, Ray A.

It is certified that error appears in the above-identified patent and that said Letters Patent is hereby corrected as shown below:

Column 5, line 32: after "couplings" add --39--.

Column 5, line 35: after "coupled" insert --by couplings 41--.

Column 5, line 36 after "clamps", add -- 42 --.

Column 6, line 47 after clamps, renumber "41" with -- 42 --.

Drawings:

Figure 5, "41" should be replaced with --39-- and present "39" and lead line should be deleted.

Signed and Sealed this

Seventh Day of December, 1999

Attest:

Attesting Officer

Q. TODD DICKINSON

Acting Commissioner of Patents and Trademarks